Jan. 9, 1968  R. W. DEWEY ET AL  3,363,257
RECORDER WITH EDGE-LIGHTED SCALES AND FLUORESCENT INDICATOR
Filed Aug. 17, 1966  2 Sheets-Sheet 1
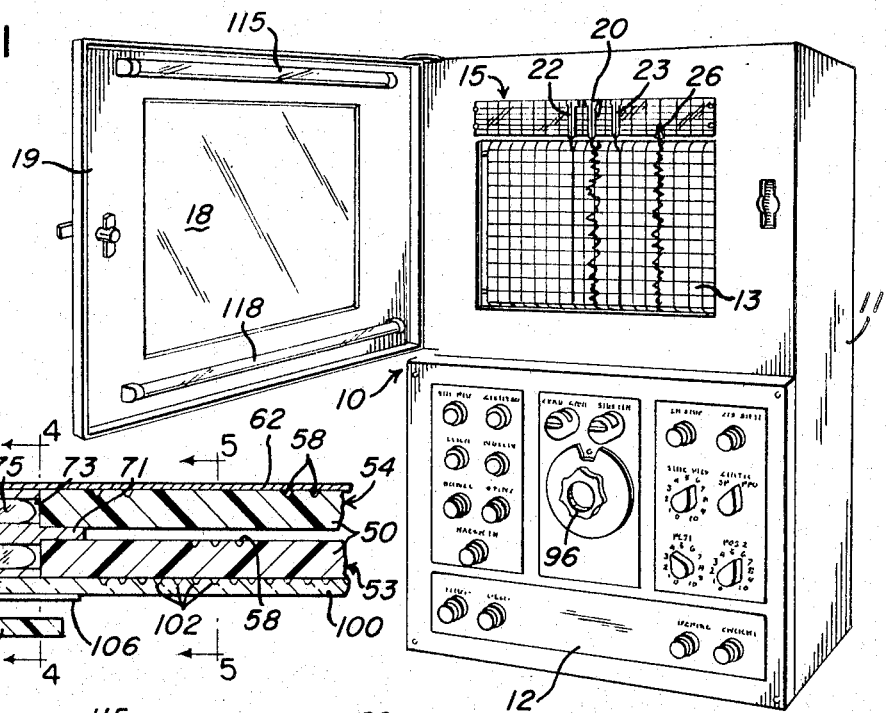
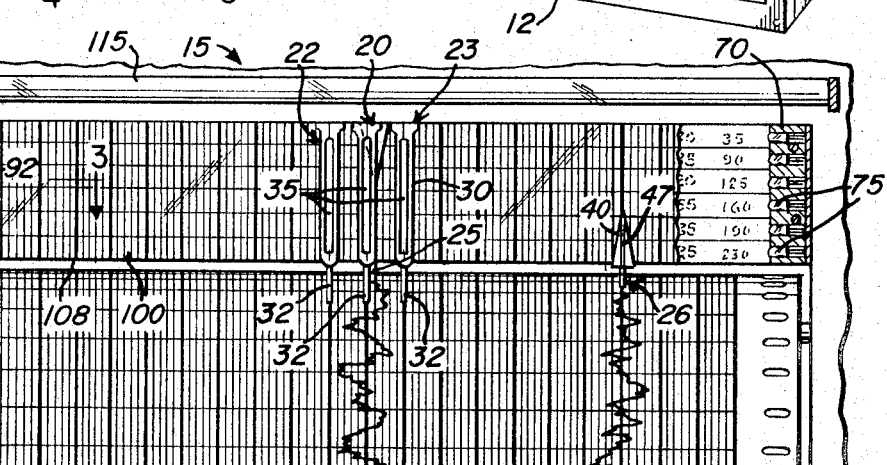
INVENTORS
REX W. DEWEY &
JUAN H. CRAWFORD
BY
*Marechal, Biebel, French & Bugg*
ATTORNEYS

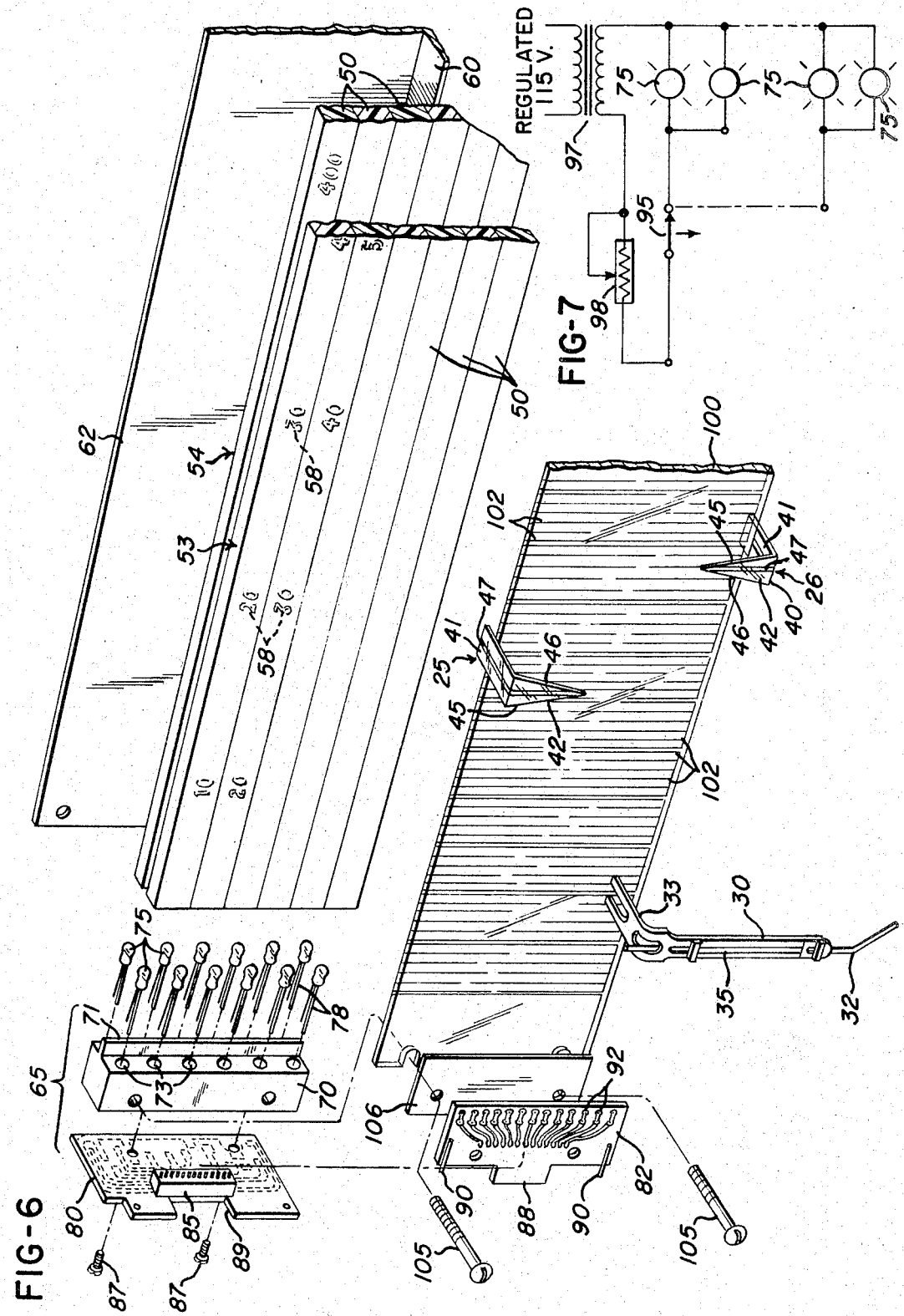

United States Patent Office 3,363,257
Patented Jan. 9, 1968

3,363,257
RECORDER WITH EDGE-LIGHTED SCALES AND FLUORESCENT INDICATOR
Rex W. Dewey and Juan H. Crawford, Columbus, Ohio, assignors to Industrial Nucleonics Corporation, a corporation of Ohio
Filed Aug. 17, 1966, Ser. No. 573,073
12 Claims. (Cl. 346—17)

This invention relates to recording instruments and more particularly to an improved pen-type, moving chart recorder which provides a highly visible and easy-to-read presentation and versatility in the selection of the recorder scales.

Pen-type moving chart recorders, particularly recorders used with measuring instruments in an industrial environment, are normally poorly illuminated. Often, the recorders are positioned at some distance from the operator, and difficult to read under commonly existing lighting conditions. Difficulties in reading and observing the recorder, such as difficulties in observing the positions of the pens, and in choosing and reading the selected recorder scale, can lead to delays and even misinterpretations due to ambiguity or lack of clarity in the presentation.

In many instances, a large number of recorder scales are required, such as where the recorder is used with measuring equipment covering a wide range of measurements, particularly where two or more measurements are simultaneously made and recorded. Often, such recorders have profusion of scales, with some of the scales being printed on the front glass of the recorder, obscuring the chart and pens, and further complicating the difficulty in making fast and accurate adjustments and readings.

The pen-type recorder of this invention substantially reduces the difficulty of reading and observing such instruments, by providing self-contained illumination for selected parts, such as for the pointers, and the scale charts. A plurality of individual recorder scales are selectable by selective edge-lighting while other critical parts to be observed are visually contrasted by providing them with an ultra-violet light responsive material which is illuminated from a source of ultraviolet or "black" light. This causes the fluorescent material on these parts to glow, and does not reduce, to any substantial degree, the relative brightness of the edge-lighted scales. The result is that the pens and other parts which are provided with the fluorescent material, together with the selected scale, stand out against a darkened background, providing a clear and highly visible presentation.

It is accordingly an important object of this invention to provide a pen-type recorder which has clear and highly visible illuminated parts and which is easy to read under adverse conditions and at extended distances.

A further object of this invention is the provision, in a recorder, of a source of ultra-violet light, and parts which are coated or otherwise provided with fluorescent material.

Another object of the invention is the provision of a recorder, as outlined above, in which one or more desired scales are selected by the illumination of one or more of a plurality of edge-lighted numeral-bearings strips, and in which the recorder pens have pointers which are provided with an ultra-violet light responsive material and are separately illuminated and thereby caused to stand out in contrast against their background, in superimposition to the selected scale or scales.

A still further object of this invention is the provision of a recorder, as outlined above, in which a transparent graduated index scale is positioned adjacent the edge of the chart, and is provided with fluorescent index lines which coincide with the lines on the chart paper, and against which the pen position indicators are observed and through which the selected scale is observed.

These and other objects and advantages of the present invention will be apparent from the following description, the accompanying drawings and the appended claims.

In the drawings—

FIG. 1 is a perspective view of a pen-type, moving chart recorder constructed according to this invention;

FIG. 2 is an enlarged fragmentary elevational view, being partially broken away, of the upper portion of the recorder showing the relative position of the ultra-violet lamp, the marker pens, and the recorder scale assembly;

FIG. 3 is a horizontal fragmentary enlarged section through the scale assembly taken generally along the line 3—3 of FIG. 2;

FIG. 4 is a vertical fragmentary section through the scale assembly taken generally along the lines 4—4 of FIG. 3;

FIG. 5 is a further vertical section taken generally along the line 5—5 of FIG. 3;

FIG. 6 is a perspective exploded view of a portion of the scale assembly of this invention, also showing parts of three of the marker pens; and FIG. 7 is a wiring diagram showing a typical switching circuit for controlling the illumination of the scales.

Referring to the figures of the drawings which illustrate a preferred embodiment of this invention, a moving chart, pen-type recorder is illustrated generally at 10 in FIG. 1. The recorder 10 is contained in the upper portion of a rectangularly shaped cabinet 11. The lower portion of this cabinet contains a control panel 12 for the recorder and the associated measuring equipment. For example, the recorder 10 may be used in connection with on-line thickness, basis weight and/or moisture measurement and control systems such as shown, for example, in the patents of Alexander et al. 3,108,844 of Oct. 29, 1963, Hickman et al. 3,007,052 of Oct. 31, 1961; and Huffman, 3,214,845 of Nov. 2, 1965; all assigned to the same assignee as this invention.

The recorder 10 generally includes a strip chart 13 and associated drive mechanisms by which the chart paper is rolled off from an upper roll and rerolled onto a bottom roll at a controlled rate. The chart 13 is pre-printed with a plurality of index lines 13' for forming a continuous graph of the fixed and variable quantities to be recorded thereon.

The recorder 10 also includes a scale assembly portion indicated generally at 15 adjacent the upper edge of the chart 13 and extending transversely the width thereof by means of which the selected scale or scales of the recorder are indicated. The portion 15 also includes the several recorder pens and the pen drive and positioning mechanisms.

The chart 13 and other recorder parts associated with the chart are observed through a window 18 formed in the hinged front door 19 of the recorder cabinet 11. In normal operation, the door 19 is closed, but is shown in FIG. 1 as being swung to the open position for the purpose of illustrating some of the features of this invention.

The recorder 10 includes a plurality of pens, and for the purpose of illustrating a preferred embodiment of this invention, the recorder is shown as including a target pen 20, a pair of tolerance pens 22 and 23 positioned at either side of the target pin 20, and servo-driven marker pens 25 and 26. The term "pen" as used herein refers to the assembly of associated parts which make up a complete line drawing device, including the inking-applying tip and the indicating portions which are viewed by an operator to determine the position of the tips relative to the chart. The target and tolerance pens are commonly connected one end to a suitable positioning or traversing mechanism and normally remain at fixed locations, but may be adjusted in spacing or transverse positions by the operator, as desired. Also, while capillary chart marking pens are shown for the tolerance and target pens, it is within the scope of this invention to employ only non-marking pointers instead.

The marker pens 25 and 26 are positioned by the recorder mechanism in accordance with the measured variable or variables. For example, the recorder 10 may be used with an industrial Beta ray gauge for simultaneously measuring and recording the basis weight and moisture content of a moving web of paper, with weight being recorded by the pen 25 and the percentum of moisture centent being recorded by the pen 26. Each of the tolerance pens 22 and 23 and the target pen 20 is formed as an assembly of parts including a generally vertically extending indicating portion 30 (FIG. 6) which is visible through the transparent front of the cabinet. The indicating portion 30 slidably supports a capillary pen element 32, the tip of which normally contacts the chart. An inwardly directed tab 33 of the portion 30 may be attached to a suitable traversing or positioning mechanism, as previously noted. The upper end of the pen element 32 is connected by a tube to a source of ink, not shown.

Each of the pens 20, 22 and 23 has means on the indicating portions 30 defining a vertically-positioned, ultraviolet light responsive strip 35 formed of suitable material, such as a strip of fluorescent paint, tape, or the like. The strip 35 thereon accordingly coincides substantially with the position of the pin element 32 on the chart, and may be of any suitable contrasting colors. For instance orange and green fluorescent paints or tapes have been found to be quite effective.

The servo-driven pens are each similarly provided with indicators 40 formed of light-weight, clear plastic material and have an inwardly extending portion 41 connected for movement with pen driving apparatus, and a front-viewable triangular pointer portion 42. As shown, for example, in FIGS. 2 and 6, the front portions 42 of the pen indicators 40 may be either downwardly directed, as in the case of the pen 25, or upwardly, as in the case of the pen 26. The pointer portions 42 are preferably formed with beveled side edges 45 and 46 and a bisecting, centrally-disposed vertical index line 47 formed on the inner face thereof. The beveled edges 45 and 46, and the line 47, are similarly provided with fluoroescent material, preferably contrasting in color to that employed on the pens 20, 22 and 23.

In addition, the scale assembly portion 15 includes a plurality of elongated scale-indicating strips 50 which provide the operator with a numerical presentation corresponding to the selected scale of the recorder. These strips are positioned transversely of the chart and viewable adjacent its upper edge. The individual strips 50 are selectively illuminated by edge-lighting so that the markings on one or more of the strips 50 are visible through the window 18 providing information of the selected recorder scale.

The transparent strips 50, shaped as elongated right prisms, extend horizontally the width of the chart, and a plurality of the individual strips are contiguously stacked one on top of the other, defining first and second strip sets as columns 53 and 54. The second set 54 is positioned immediately behind the first set 53, for viewing therethrough. Each of the strips 50 contains indicia 58 cut or suitably engraved into the back planar surface defining a particular one of the selectable scales.

The strips 50 are preferably formed of clear methyl methacrylate resin sold under the tradename of "Lucite," which has relatively high index of refraction and which acts as an efficient light conductor. The indicia 58 are preferably formed in the rear faces of the individual strips by engraved V-shaped grooves. However, the indicia 58 may be formed by etching or scribing with a hard stylus in the manner taught in the U.S. patent of Isborn 2,751,584 of 1956.

Accordingly, each of the numeral scales comprise a clear plastic prism which acts as a conduit for light, with the engraved indicia 58 providing means through which the light may escape. The engraved marks 58 are formed at such an angle that the light escapes from the prism in the area of the numerals thus causing the numerals to be illuminated and clearly visible through the front of the recorder. The numerals or indicia 58 on the front column or set 53 of the prisms are preferably staggered with respect to the numerals on the rear set 54 so that the view of any scale illuminated in the rear column is not distorted by an engraved numeral directly in front of it.

The front and rear vertical columns of the strips 52 are supported on the bottom ledge 60 of a sheet-metal backing member 62. The backing member 62 preferably has its inside adjacent surface anodized dull black and comprises means forming a non-reflecting, darkened background for the assembly 15. The arrangement herein of twelve strips 50 provides selection of twelve different scales for the recorder 10. However, it is within the scope of this invention to provide additional strips 50 in each of the columns 53 and 54, and to provide additional such columns for the purpose of providing additional selectable recorder scales.

Means for selectively edge lighting any one or more of the strips 50 in either the front or rear columns includes an edge lighting assembly 65 positioned at each of the opposite ends of each of the strips. Identical such edge lighting assemblies 65 are preferably provided at each end, as shown in FIG. 2. The assembly 65 includes a lamp housing block 70 which may be formed of aluminum, and which is provided with a generally vertically-extending separator tongue 71 positioned between, and extending a short distance transversely of the strip columns 53 and 54.

Each of the blocks 70 is provided with bores or recesses 73 aligned vertically in rows on each side of the tongue 71. The recesses 73 receive miniature incandescent lamps 75 therein, and open transversely outwardly adjacent the planar abutting end of each of the strips 50. There are one of the recesses 73 and lamps 75 at each end of the strips 50, with the lamps being positioned closely adjacent the ends of the associated strip, as shown in FIG. 3, to project light into the strip. The protruding tongue 71 defines and maintains the vertical alignment of the strip sets and prevents light diffusion from one set to the other. Also, the adjacent horizontal joining surfaces of the strips may be suitably coated over a short distance with non-reflecting or other suitable opaque coating where the angle of incidence of the light rays emanating from the lamps 75 is such that they would escape rather than being reflected internally through the length of the strip.

The leads 78 of the lamps 75 are connected for selective illumination through two interconnected circuit boards 80 and 82, each of which supports one-half of a multi-pin connector 85. One lead 78 of each lamp 75 is suitably insulated such as by plastic tubing over the lead. The circuit board 80 is secured to the back of the block 70, such as by screws 87 in FIG. 6. The leads 78 are brought through the block 70 and through holes in the board 80 and make electrical connections with the circuit printed on the back of the board 80. This circuit provides a common connection for each of the lamps 75 and individual energizing connections, all of which are brought to one-half of the connector 85.

The circuit board 82 is similarly provided with the other half of the connector 85 and is mounted in right-angular relationship to the board 80 with the tongue 88 thereon extending into a slot 89 on the board 80.

The board 82 is retained in aligned position on the board 80 by means of pins 90 which are received within suitable holes formed in the board 80, to align and reduce strain on the halves of the multi-pin connector 85. A suitable cable, not shown, connects with the terminals 92 on the board 82 for remote control of the energization of the lamps 75. The lamps in the lamp assembly 65 at the opposite ends of the strips are simultaneously illuminated thereby providing uniform illumination to each set of indicia 58 across the width of the recorder 10.

The circuit means for illuminating one or more of the strips 50 to provide clear visual indication of the selected scale or scales may take any suitable form, such as a switch, relay contacts, transistor switching, silicon controlled rectifier switching, and the like. A suitable circuit may consist of a multiple-contact, scale selector switch 95 shown in FIG. 7 which is operated by a control knob 96 shown on the panel 12 of FIG. 1. The lamps 75 are shown in the circuit of FIG. 7 as being connected in parallel pairs, corresponding to the lamps at each end of each of the strips 50. The switch 95 may have one or more sets of contacts or sections which are rotated by the knob 96 to select one or more of the desired sets of lamps 75 in accordance with a desired scale of the recorder. Preferably, the lamps 75 operate on a low voltage, such as 5 volts, and for this purpose, a 6.3 volt filament transformer 97 may be employed, as shown, with the secondary thereof being connected in series with an adjustable rheostat 98, connected in turn to the movable or common contact of the switch 95.

The recorder of this invention further includes a graduated index scale 100 which consists of a sheet of transparent plastic material upon which are scribed vertical index lines 102, corresponding in number and spacing to the index or graph lines 13′ printed on the chart paper. The index scale 100 is positioned in overlying relation to the front strip column 53 and is supported against the forward surface of the blocks 70 by screws 105 and small flat retainer plates 106. The lower edge 108 of the scale 100 is accordingly positioned immediately above the upper edge of the chart 13 with the lines 102 in vertical alignment with the corresponding lines 13′ of the chart. The lines 102 are scribed with a machine tool and are filled or coated with an ultra-violet light responsive material, such as fluorescent paint.

The pairs of screws 105 at each end of the scale assembly 15 extend through holes in the plates 106, notches in the end of the index scale 100, and aligned holes in the blocks 70 and in the backing member 62, and one of the screw pairs is threaded into a spacer 109 while the other screw 105 is threaded into a supporting frame structure 110. The outer circuit board 82 is positioned outwardly of the heads of the screws, and may be removed by sliding transversely to uncouple the electric connection to the associated edge lighting assembly 65.

The recorder 10 also includes means forming a source of ultra-violet light for illuminating the fluorescent material on the indicating portion of the several pens, and the scale 100. This may consist of a tubular ultra-violet lamp 115 positioned on the upper inside surface of the door 19 above the window 18 in such a manner that the light therefrom is distributed uniformly across the scale assembly portion 15 of the recorder. In this manner, the fluorescent material on the individual pens and pointers and in the lines 102 of the scale 100 are caused to fluoresce or glow against a relatively dark background.

In addition to the ultra-violet lamp 115, a "white" lamp 118 may be positioned on the inside of the door 19 below the window 18 for general illumination of the chart 13. Also, it is within the scope of this invention to use a single white or blue-white fluorescent lamp in place of the ultra-violet lamp 115 provided it has a sufficient component of light in the ultra-violet range to cause the fluorescent material on the pens, markers and index strip to glow in contrast to the numerals of the strips 50.

It is within the scope of this invention to provide different or contrasting fluorescent materials for the separate pens and for the index scale 100 to enhance contrast. Also, more than one of the strips 50 may be illuminated at any one time, such as where the recorder is used to provide simultaneous and continuous display of two parameters, for example, basis weight and moisture content in a continuously moving web of paper.

It is preferable not to use two strips simultaneously which are in direct fore and aft alignment to prevent possible interference and confusion in the presentation. This is avoided by proper placement of the scale factor strips.

It is also within the scope of this invention to apply the teachings thereof to many types of recorders, including the X-Y recorders which plot two variables simultaneously on the chart. Such an X-Y recorder is described and schematically illustrated in the patent of Alexander No. 2,909,660, of 1959, assigned to the same assignee as this application.

The markings 58 on the selected illuminated strip 50 on the more rearward column 54 are clearly visible through the corresponding unilluminated strip immediately in front of it in the forward column 53. Since the plastic resin material employed has a relatively high index of refraction, the image of the indicia formed in the more rearward column is seen by the observer as only being slightly further removed than those formed by the illumination of selected strips 50 in the more forward column, and is not objectionable or noticeable at normal viewing distances.

The overall effect is one of contrast and readability. Those parts which are to be observed, that is the pens and the illuminated indicia on the scale strips, stand out clearly from the background and from each other. White light is preferably used for the scale strips, that is, the lamps 75 are clear. Therefore, the illuminated set or sets of indicia are observed as a row of relatively bright, white, spaced numerals. The portions of the strips which are not engraved are only slightly lighter than the unilluminated strips, and the darkened background provided by the member 62 causes the illuminated indicia to stand out. The fluorscent lines formed on the graduated index scale 100 and the fluorescent material on the pens and pointers themselves glow, but the ultra-violet light does not diminish the relative brightness of the numerals representing the selected scale. Accordingly, the portions of the pens in relation to the graduated scale 100 and the recorder scale selected by the switch 95 are easily and readily observed substantially reducing the likelihood of errors or misinterpretations in operating the instrument.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A pen-type recorder having at least one pen for graphing a measured quantity on a movable chart and having illuminated parts viewable by an operator for visual readout, comprising a cabinet having a front opening, a recorder mechanism in said cabinet including a movable chart viewable through said cabinet front opening, said recorder mechanism having a scale assembly portion positioned adjacent an edge of said chart and visible through said opening and including a plurality of strips having indicia thereon representing particular scales of said recorder, means for selectively lighting said strips for illuminating the indicia forming the associated said recorder scale for viewing through said front opening, said pen having an indicating portion visible through said opening corresponding to the position of said pen on said chart, ultra-violet light responsive material on said pen indicator portion, and a source of ultra-violet light separate from said strip illuminating means directed on said indicating portion causing said material to glow without reducing to any substantial degree the relative brightness of the illuminated said indicia providing the operator with easily readable illuminated information of said recorder scale and the position of said pen in relation to said chart.

2. The recorder of claim 1 in which said fluorescent pen indicating portion is positioned in overlying relation to said strips.

3. The recorder of claim 1 in which said strips are formed as elongated prisms and are arranged in columns with at least one of said columns being positioned inwardly of another of said columns, and with the indicia formed on the strips of said one column being observed through the strips of said other column.

4. The recorder of claim 1 including a scale factor selector, operable to effect selective illumination of said strips.

5. The recorder of claim 1 wherein said chart is lined and said recorder further including a transparent scale positioned in overlying relation to said strips, and means on said scale forming graduated lines of fluorescent material illuminated by said source and positioned in general alignment with the lines formed on said chart.

6. The recorder of claim 5 in which said pen indicating portion is positioned in overlying relation to said transparent scale and said transparent scale is positioned in overlying relation to said strips, and one edge of said scale is positioned adjacent one edge of said chart.

7. A pen-type recorder having at least one moving pen and at least one position marking pen for graphing a measured quantity on a movable chart and having illuminated parts viewable by an operator for visual readout, comprising a cabinet having a front opening, a recorder mechanism in said cabinet including a movable chart viewable through said cabinet front opening, said recorder mechanism having a scale assembly portion positioned adjacent an edge of said chart and visible through said opening and including a plurality of transparent, light-transmitting strips having indicia thereon representing particular scales of said recorder, means for selectively edge-lighting said strips for illuminating the indicia thereon forming the associated said recorder scale for viewing through said front opening, said pens each having an indicating portion visible through said opening and representing the positions of said pens on said chart, ultra-violet light responsive material on said pen indicator portions, and a source of ultra-violet light separate from said strip illuminating means directed on said indicating portions causing said material to glow without reducing to any substantial degree the relative brightness of the illuminated said indicia providing the operator with easily readable illuminated information of said recorder scale and the positions of said pens in relation to said chart.

8. A pen type moving chart recorder comprising a recorder mechanism having a movable chart of paper, a recorder scale assembly positioned adjacent one edge of said chart and extending transversely thereof providing an indication of the selected scale of said recorder, said assembly including a plurality of transparent strips of light-conducting material, each of said strips having a surface thereof visible to an operator, means on said strip surfaces forming recorder scale numerals positioned transversely of said chart paper, means for lighting said strips including separately illuminated lamp means for each of said strips positioned to direct light into said strips for illuminating said numerals, means for selectively illuminating said strips by the selective energization of said lamp means, a plurality of recorder pens each having indicating portions in generally overlying relation to said scale assembly so that the portions thereof may be observed in relation to the said selected scale of said recorder, ultraviolet light responsive material on said pen portions, and means forming a source of ultra-violet light directed on said indicating portions causing said material to fluoresce in visual contrast with the illumination of said scale numerals by said lamps.

9. The recorder of claim 8 in which there are a plurality of said strips arranged in contiguous relation in a column.

10. The recorder of claim 9 in which there are a plurality of said columns with at least one of said columns positioned inwardly of another of said columns and viewable by an operator through said other column.

11. The recorder of claim 8 further comprising lined graph paper on said recorder mechanism, and means on said chart forming a graduated index scale of transparent material having formed thereon index lines corresponding generally in spacing to the said lines on said graph, means mounting said graduated scale on said recorder scale assembly in overlying relation to said strips, and fluorescent material in said graduated markings which is caused to glow by said ultra-violet source.

12. A pen type moving chart recorder comprising a movable chart of graph paper, a recorder scale assembly positioned adjacent an upper edge of said chart and extending transversely thereof providing an indication of the selected scale of said recorder, said assembly including a plurality of transparent strips of light conducting material with adjacent said strips being positioned in contiguous relationship to each other, each of said strips having a surface thereof visible to an operator, a separate lamp assembly positioned at each end of said strips, a separately illuminated lamp in each of said lamp assemblies for each of said strips positioned to direct light into said strips of the opposite ends thereof, means in said strips forming recorder scale numerals illuminated for viewing through the associated said surfaces when the associated said lamps are illuminated, means for selectively illuminating said strips by the selective energization of opposite pairs of said lamps, a plurality of recorder pens having indicator portions in generally overlying relation to said scale assembly so that the portions thereof may be observed in relation to the said selected scale of said recorder, ultra-violet light responsive material on said indicator portions, and means forming a source of ultra-violet light in said recorder causing said material to fluoresce in visual contrast with the illumination of said scale numerals by said lamp pairs.

References Cited
UNITED STATES PATENTS

| | | | |
|---|---|---|---|
| 1,932,201 | 6/1933 | Haven | 250—72 X |
| 2,619,068 | 11/1952 | Malheiros et al. | 240—1 X |
| 2,924,499 | 2/1960 | Young et al. | 346—17 X |

RICHARD B. WILKINSON, *Primary Examiner.*

J. W. HARTARY, *Assistant Examiner.*